United States Patent [19]

Lee

[11] 4,433,742
[45] Feb. 28, 1984

[54] LINEAR MOTION LINKAGE

[75] Inventor: Shih-Ying Lee, Lincoln, Mass.

[73] Assignee: Setra Systems, Inc., Acton, Mass.

[21] Appl. No.: 265,092

[22] Filed: May 19, 1981

[51] Int. Cl.³ .................. G01G 3/08; G01G 21/24; E04G 3/00
[52] U.S. Cl. ..................... 177/229; 74/110; 177/255; 248/274
[58] Field of Search ............ 177/229, 255, DIG. 9; 248/274; 74/110

[56] References Cited

U.S. PATENT DOCUMENTS

| | | | |
|---|---|---|---|
| 2,649,294 | 8/1953 | Walter | 177/229 |
| 3,443,653 | 5/1969 | Marshall | 177/225 |
| 3,590,933 | 7/1971 | Forman | 177/229 |
| 3,986,571 | 10/1976 | Strobel | 177/210 |
| 4,020,686 | 5/1977 | Brendel | 177/229 |
| 4,022,288 | 5/1977 | Canevari | 177/229 |
| 4,062,416 | 12/1977 | Berg | 177/229 X |
| 4,062,417 | 12/1977 | Kunz | 177/212 |
| 4,065,962 | 1/1978 | Shoberg | 73/141 A |
| 4,072,202 | 2/1978 | Storace | 177/229 |
| 4,143,727 | 3/1979 | Jacobson | 177/229 |
| 4,153,124 | 5/1979 | Knothe et al. | 177/229 |
| 4,153,126 | 5/1979 | Knothe et al. | 177/229 |
| 4,170,270 | 10/1979 | Sette et al. | 177/229 X |
| 4,184,557 | 1/1980 | Kunz | 177/229 |
| 4,382,479 | 5/1983 | Lee | 177/229 X |
| 4,383,586 | 5/1983 | Lee | 177/229 |

*Primary Examiner*—Joseph W. Hartary
*Attorney, Agent, or Firm*—Kenway & Jenney

[57] ABSTRACT

A mechanical linkage particularly useful in weighing systems for constraining the motion of a reference member to be along a reference axis.

4 Claims, 2 Drawing Figures

LINEAR MOTION LINKAGE

REFERENCE TO RELATED APPLICATION

The subject matter of this application is related to that of U.S. patent application Ser. No. 265,088 now U.S. Pat. No. 4,382,419, Weighing System, filed on even date herewith.

BACKGROUND OF THE INVENTION

The present invention is in the field of mechanical linkages, and more particularly, relates to linkages for constraining relatively large motion of the reference member to be along a reference axis.

Linkages for constraining motion of an element to be along a reference axis are particularly useful in weighing systems, or scales, where it is desired to sense the weight of an object. Such systems require transfer of the gravitational force of the object to a force sensor without the introduction of error components due to friction and other sources. Typically, in the prior art, this function is established by a basically parallelogram linkage. In one form, a pair of V-shaped flexure (or hinged) elements, each having a vertex portion and a pair of distal end portions, is configured with the distal end portions being affixed to a support member or casing, so that the V-shaped members lie in parallel planes. A connecting link is fastened between the vertex portions of the flexure elements. With this configuration, in order to precisely constrain the motion of the reference member coupled to the link to a motion along that reference axis, the V-shaped elements must be precisely positioned with respect to the support member in order to achieve the desired parallelism. As a practical matter, this requires critical alignment of the flexure elements during the fastening of the distal ends of those elements to the support member. Even with such precise positioning of the flexure elements, the range of motion for which the reference member follows the reference axis is relatively limited. Moreover, with large motions, there is also substantial side motion of the reference member.

It is an object of the present invention to provide an improved linkage for constraining the motion of an element to motion along a reference axis with a relatively large range of motion.

SUMMARY OF THE INVENTION

Briefly, the present invention is directed to a linkage for constraining the motion of a reference member to be along a reference axis. The linkage includes two pairs of flexure elements, each flexure element having a vertex end portion and at least one distal end portion. The flexure elements of each pair are connected so that their corresponding pairs of distal end portions are coupled to each other. Each of the coupled distal end portions is connected by a rigid link to the corresponding pair of connected distal end portions of the other pair of flexure elements so that the junction of the distal end portions of each coupled pair are separated by a predetermined distance in the direction of the reference axis. The vertex portions of corresponding ones of the flexure elements of each pair is connected to the reference member. The two vertex portions coupled to the reference member are separated by the predetermined distance in the direction of the reference axis. The vertex portions of the other flexure elements are connected to the support member at points separated by the predetermined distance in the direction of the reference axis.

With this configuration the reference member is constrained to motion along the reference axis which is fixed with respect to the support member. The range of motion of the substantially axial motion is relatively large compared with the prior art linkages. Moreover, the linkage resist side forces and moments, as well as minimizes off-axis motions.

BRIEF DESCRIPTION OF THE DRAWINGS

The foregoing and other objects of this invention, the various features thereof, as well as the invention itself, may be more fully understood from the following description, when read together with the accompanying drawings in which.

DESCRIPTION OF THE PREFERRED EMBODIMENT

Figure 1:
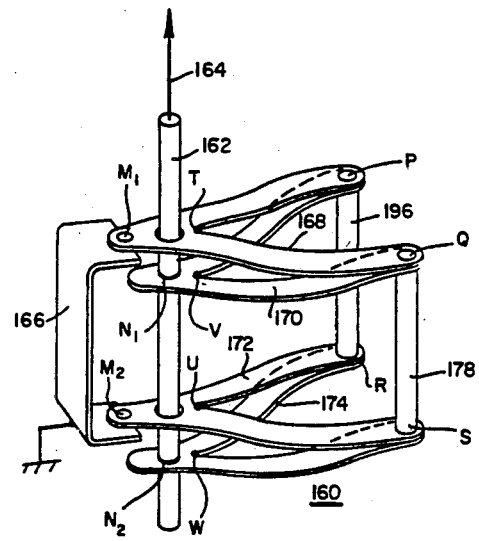
FIGS. 1 and 2 show an exemplary embodiment of the present invention.

FIG. 1 shows an exemplary embodiment of the present invention. In this form, a linkage 160 is shown which is adapted for constraining the motion of a reference member 162 to be along a reference axis 164 which is fixed with respect to a support member 166. The linkage 160 includes two pairs of V-shaped flexure elements made of metal or other elastic material. The first (or upper) pair includes elements 168 and 170 and the second (or lower) pair includes elements 172 and 174. Each of elements 168, 170, 172 and 174 has a vertex end portion and first and second distal end portions.

In other embodiments, each flexure element may be I-shaped (i.e. have only a vertex end portion and a single distal end portion). In yet other embodiments, the flexure elements may be triangular (or rectangular) where the first and second distal end portions correspond to two adjacent corners of each rectangle.

In the present embodiment, the first distal end portions of the upper pair of flexure elements (elements 168 and 170) are coupled to each other, and the second distal end portions of the upper pair are coupled to each other. Similarly, the first distal end portions of the lower pair of flexure elements (elements 172 and 174) are coupled to each other and the second distal end portions of the lower pair are coupled to each other.

The first distal end portions of the upper pair of flexure elements are also coupled to the first corresponding distal end portions of the lower pair of flexure elements by a rigid coupling member 176 having length L in the direction of reference axis 164. Similarly, the coupled second distal end portions of the upper pair of flexure elements are also coupled to the second distal end portions of the lower pair of flexure elements by a rigid coupling member 178 having length L in the direction of reference axis 164.

The vertex portion of the upper flexure element 166 of the upper pair is coupled to the support member 166 at a point $M_1$ on that flexure element. Similarly, the vertex portion of the upper element 172 of the lower pair is coupled to the support member 166 at a point $M_2$ where points $M_1$ and $M_2$ are separated by a distance L in the direction of axis 164.

The vertex portion of the lower flexure element in the upper pair is coupled to the reference member 162 at a point $N_1$. Similarly, the vertex portion of the lower element 174 of the lower pair is coupled to the reference member 162 at point $N_2$.

In the present embodiment, the extensions of the vertex portions beyond the respective points T, U, V, and W act substantially as rigid couplings to the respective ones of reference member 162 and support member 166. Consequently, the distance between points $M_1$ and $M_2$ ($M_1M_2$) substantially equals the distance between points T and U (TU) and the distance between points $N_1$ and $N_2$ ($N_1N_2$) substantially equals the distance between points V and W (VW), where all of those distances $M_1M_2$, TU, $N_1N_2$ and VW refer to distances in the direction of axis 164. As a result, all of the distances QS, PR, VW and TU are equal to L.

In addition, point S is equidistant on the surface of said flexure elements 172 and 174 from points W and U (i.e. SW=SU), point R is equidistant on the surface of said flexure elements 172 and 174 from points W and U (i.e. RW=RU), point Q is equidistant on the surface of said flexure elements 168 and 170 from points T and V (i.e. VQ=TQ), and point P is equidistant on the surface of said flexure elements 168 and 170 from points T and V (i.e. VP=TP). Although it is not necessary, all of distances SW, SU, RW, RU, VQ, TQ, VP and TP may be equal.

With this configuration, the reference member 162 is constrained to motion substantially along the axis 164 which is fixed with respect to the support member 166. The range over which that motion is substantially along axis 164 is relatively large compared to that permitted in the prior art linkages.

Figure 2:
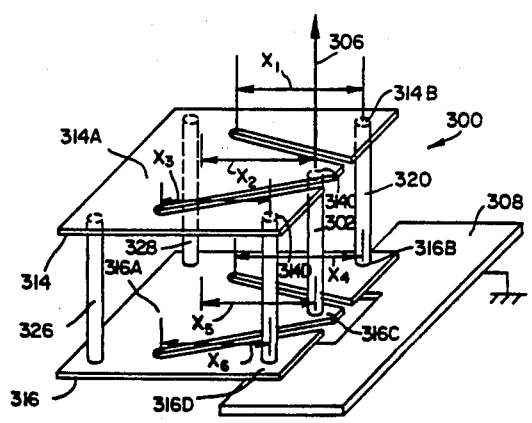

FIG. 2 shows another linkage 300 which constrains the motion of a reference member 302 to be substantially along an axis 306 which is fixed with respect to a reference member 308. The linkage 300 includes one pair of spring steel flexure elements, including upper element 314 and lower element 316. Element 314 includes a vertex portion 314A and three distal end portions 314B, 314C and 314D. Element 316 similarly includes a vertex portion 316A, and three distal end portions 316B, 316C, and 316D.

The distal end portions 314C and 316C are coupled to member 302 at points on that member separated by L' in the direction of axis 306.

The distal end portions 314B and 316C are coupled by link 320 so that those end portions are separated by distance L' in the direction of axis 306. The end portions 314D and 316D are similarly coupled by link 322 so that those end portions are separated by distance L' in the direction of axis 306. End portions 316B and 316D are also coupled directly to the fixed reference member 308.

The vertex portions 314A and 316A are coupled by links 326 and 328 so that those vertex portions are separated by L' in the direction of axis 306.

The effective flexure length (X1) between the vertex portions 314A and distal end portions 314B equals the effective flexure length (X4) between the vertex portion 316A and distal end portion 316B. Similarly, the effective flexure length (X2) between vertex portion 314A and end portion 314C equals the effective flexure length (X5) between vertex portion 316A and end portion 316C and the effective flexure length (X3) between vertex portion 314A and end portion 314D equals the effective flexure length (X6) between vertex portion 316A and end portion 316D.

In the illustrated embodiment, X1=X2=X3=X4=X5=X6 but it is only necessary that X1=X4, X2=X5 and X3=X6. With this configuration, the reference element 302 is constrained to be relatively large (compared with the prior art) motions substantially along axis 306.

In the present embodiment, the flexure portions of elements 314 and 316 leading to distal end portions 314C and 316C are tapered. While not necessary to the invention, this tapering results in those flexure portions being resultant to twisting about their longitudinal axes.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. Linkage for constraining motion of a reference member to be along a reference axis, said reference axis being fixed with respect to a support member, comprising:

two pairs of flexure elements, having corresponding vertex end, flexure, and distal end portions, each of said flexure elements having a vertex end portion and at least one flexure portion extending therefrom and terminating in an associated distal end portion, a rigid coupling member associated with each set of corresponding distal end portions of said two pairs, wherein the corresponding distal end portions of each pair are coupled to each other, wherein said coupling members couple the respective junctions of the distal end portions of the first pair of flexure elements to the respective junctions of the corresponding distal end portions of the second pair at points separated by a predetermined distance in the direction of said reference axis, wherein the vertex portions of said first pair of flexure elements are equidistant from the corresponding distal portions of those elements, wherein the vertex portions of said second pair of flexure elements are equidistant from the corresponding distal end portions of those elements, wherein the vertex portions of upper flexure element of each pair are coupled to said reference member at points separated in the direction of said reference axis by a direction substantially equal to said predetermined distance, and wherein the vertex portions of the lower flexure element of each pair are coupled to said support member at points separated in the direction of said reference axis by a distance substantially equal to said predetermined distance.

2. A linkage according to claim 1 wherein each flexure element has two flexure portions and associated distal end portions.

3. A linkage according to claim 2 wherein each flexure element is V-shaped.

4. Linkage for constraining a motion of a reference member to be along a reference axis, said reference axis being fixed with respect to a support member, comprising:

two flexure elements, each flexure element having corresponding vertex end portions and first, second and third flexure portions extending therefrom and terminating at first, second, and third distal end portions, respectively, said second flexure portion being between said first and second flexure portions, wherein said first flexure portions are substantially equal in length, said second flexure portions are substantially equal in length and said third flexure portions are substantially equal in length, first, second, and third rigid coupling members, said first and third coupling members being fixedly coupled to said support member, wherein said first coupling member couples the first distal end portion of one flexure element to the first distal end portion of the other flexure element at points separated by distance L' in the direction of said reference axis, wherein said second coupling member couples the third distal end portion of one flexure element to the third distal end portion of the other flexure element at points separated by distance L' in the direction of said reference axis, wherein said third coupling member couples the vertex portion of one flexure element to the vertex portion of the other flexure element at points separated by distance L' in the direction of said reference axis, and wherein the second distal end portions of said pair of flexure elements are coupled to said reference member at points separated by distance L' in the direction of said reference axis.

* * * * *